United States Patent Office 3,516,858
Patented June 23, 1970

---

3,516,858
SELF-BONDING MAGNET WIRE AND PROCESS FOR PREPARING SAME
Andrew F. Fitzhugh, Wilbraham, and James A. Snelgrove, Monson, Mass., assignors to Monsanto Company, St. Louis, Mo., a corporation of Delaware
No Drawing. Filed Aug. 14, 1967, Ser. No. 660,190
Int. Cl. B44d 1/14; B32b 15/08
U.S. Cl. 117—218      8 Claims

ABSTRACT OF THE DISCLOSURE

Disclosed herein are self-bonding magnet wires comprising a metal conductor coated with a self-fluxing base enamel prepared from a blocked isocyanate resin which in turn is coated with a self-bonding enamel which comprises a polyvinyl acetal based composition which contains at least 0.5 part by weight per hundred parts of resin component of an amine component selected from the group consisting of primary and secondary amines.

BACKGROUND OF THE INVENTION

Field of the invention

The present invention relates to insulated magnet wires which are both self-bonding and self-fluxing. A metal conductor is coated with a self-fluxing base enamel prepared from a blocked isocyanate resin which, in turn, is coated with a self-bonding outer coat of a polyvinyl acetal based composition containing at least 0.5% part by weight per hundred parts of resin component of an amine component selected from the group consisting of primary and secondary amines.

Description of the prior art

Self-bonding magnet wires are well known in the art and are generally described in U.S. Pats. 3,239,598 and 3,300,843.

In the case of the conventional self-bonding magnet wire, an insulating material comprising a polyvinyl acetal based resin, to which may be added another thermoplastic resin, is coated and baked on an ordinary insulated wire. This double-coated insulated wire after being formed into coils or other desirable shapes is heated and/or treated with a solvent in order to soften the outer polyvinyl acetal based coating and cause it to fuse together which results in the wire turns adhering to one another when the coated material is returned to a hardened condition. Self-bonding enameled wires have excellent utility and find widespread use wherever commercial magnet wires are employed.

Self-fluxing or solderable wire enamels are also well known in the art. These self-fluxing or solderable wire enamels, which are usually based on materials such as blocked isocyanate resins, nylon or cellulose acetate, are of great utility in that they do not have to be removed from wire prior to the soldering step. On the other hand, non-self-fluxing insulation must be stripped from the metal conductor prior to the soldering step. Obviously the self-fluxing wire enamels are greatly preferred over the non-self-fluxing enamels for certain applications which involve soldering the coated magnet wire.

The progress shown in the development of the self-fluxing or solderable wire enamels was not without drawbacks, especially in the case of those enamels based on blocked isocyanate resins. These latter wire enamels have limited use in conjunction with self-bonding magnet wires by virtue of the fact that the self-bonding polyvinyl acetal based outer coat suffers a marked loss in self-bonding properties and bond strength when coated over the blocked isocyanate based self-fluxing enamels. This loss of bonding ability has curtailed the use of self-bonding polyvinyl acetal resins over the self-fluxing polyurethane based enamels.

One proposed solution to this problem calls for interposing a coat of a nylon type material between the self-fluxing coat and the self-bonding coat. However, the additional process steps and expenses involved have limited the use of this technique in the wire-coating art.

The present invention provides a solution to the problem just described by providing polyvinyl acetal based self-bonding resin which may be used over self-fluxing base enamels without the need for a barrier coat while still maintaining excellent bond strengths.

SUMMARY OF THE INVENTION

The present invention is directed to self-bonding self-fluxing magnet wires comprising a metal conductor coated with a base enamel prepared from a blocked isocyanate resin which in turn is coated with a self-bonding polyvinyl acetal based composition which contains at least 0.5 part by weight per hundred parts of resin component of an amine component selected from the group consisting of primary and secondary amines.

The present invention provides a solution to the loss of bond strength which normally occurs in self-bonding, self-fluxing magnet wires when an self-fluxing wire enamel prepared from a blocked isocyanate resin is overcoated with a self-bonding polyvinyl acetal based composition.

It is an object of this invention to provide improved self-bonding, self-fluxing magnet wires.

It is a further object of this invention to provide a self-bonding magnet wire composition for use over self-fluxing enamel base coats.

It is another object of this invention to provide self-bonded coils of self-fluxing magnet wire having improved bond strength.

It is a further object of this invention to provide a process for obtaining self-bonding, self-fluxing magnet wire having improved bond strength.

DESCRIPTION OF THE PREFERRED EMBODIMENTS

The foregoing and other objects are provided by a self-bonding, self-fluxing magnet wire comprising a metal conductor coated with a self-fluxing base enamel prepared from a blocked isocyanate resin which, in turn, is coated with a composition comprising a polyvinyl acetal based composition which contains at least 0.5 part per hundred parts of resin component of an amine component selected from the group consisting of primary and secondary amines.

The following examples are set forth in illustration of this invention and should not be construed as limitations thereof. When parts by weight are used in relation to the amine component in the self-bonding enamel, the reference is to parts by weight of amine per hundred parts of the resin component of the self-bonding wire enamel. In reference to the self-fluxing base enamel parts refer to parts by weight.

EXAMPLE 1

This example is set forth as a control to illustrate the good bond strengths obtained when a conventional polyvinyl acetal based self-bonding wire enamel is used over a conventional non-self-fluxing base enamel. However, because the coated wire of this example lacks self-fluxing properties, the insulation must be removed from the wire prior to soldering.

Preparation of non-self-fluxing base enamel and self-bonding enamel

*Enamel A. Non-self-fluxing base coat.*—One part of a cresol-formaldehyde resin which is essentially the same as that described in Example 1 of U.S. Pat. 2,307,588 and two parts of a polyvinyl formal resin having a molecular weight of about 30,000, a hydroxyl content of about 5.9% and an acetate content of about 12% are dissolved to form a 16.5% solids solution in a solvent consisting of 40 parts cresylic acid, thirty parts aromatic high-flash naphtha and thirty parts xylol. This non-self-fluxing base enamel is designated as Enamel A.

*Enamel B. Self-bonding coat.*—A 12% solids solution of a polyvinyl butyral is prepared in a solvent consisting of 40% cresylic acid, 30% high-flash aromatic naphtha and 30% xylol. The polyvinyl butyral used has a weight-average molecular weight of approximately 60,000 and a hydroxyl content of 19%, expressed as weight percentage of polyvinyl alcohol. This self-bonding wire enamel is designated as Enamel B.

In Enamels A and B above and in the following examples, the cresylic acid used is a mixture of various phenols, predominately cresols and xylenols, which distills between 200° C. and 227° C. The high-flash naphtha, commercially designated Solvesso 100, distills between 160 and 180° C.

Coating of metal conductor

Four coats of Enamel A are applied to 0.0403" diameter copper wire. After each coat, the wire is passed thru an oven, in which a curing zone approximately ten feet long was maintained at a temperature of 700° F., at a rate of 50 feet per minute. The four base coats deposit a film totalling 0.0010 inch thick. Two coats of Enamel B are then applied over the base coats using the same coating techniques. The two bonding coats added a film totalling 0.0005 inch thick, to make the overall enamel film thickness of 0.0015 inch.

Testing of self-bonding properties

Tight helices of the coated wire described above are wound on a rod 0.25" diameter. These coils are then cut into sections approximately 4" long and slipped over vertical stainless steel rods 0.25" in diameter which have previously been coated with a fluorocarbon release agent. Weights totalling 200 grams are then placed over the rods to compress the helices while one set is bonded for ½ hour at 150° C. and another set at 175° C.

The coils thus bonded are placed on supports two inches apart in a flexural testing fixture of an Instron universal testing machine and a load applied to the center at a rate of 0.2 inch per minute. The stress at break averaged 7.6 lbs. for the wire coils bonded at 150° C. and 24.4 lbs. for the wire coils bonded at 175° C. These break stress values (in pounds) which are referred to as bond strengths, are further tabulated in Table I.

Attempts to solder this wire enamel without removing the insulation layer failed to give an acceptable soldered joint because of the non-self-fluxing properties of the conventional base coat.

The following Example 2 is set forth to illustrate the poor bond strength but good self-fluxing properties obtained when using a conventional polyvinyl acetal based composition as a self-bonding wire enamel over a conventional self-fluxing enamel.

EXAMPLE 2 (Control)

*Enamel C. Self-fluxing base enamel prepared from a blocked isocyanate resin.*—One part of the polyvinyl formal resin used in Enamel A of Example 1, one part of a saturated, liquid, polyester resin, (equivalent weight approximately 140, hydroxyl number approximately 400) and 2.2 parts of a blocked triisocyanate resin which is the reaction product of 1 mol of hexanetriol, 3 mols of 2,4-tolylene diisocyanate and 3 mols of phenol are dissolved in a mixture of 4.4 parts of cresylic acid and 6.4 parts of aromatic naphtha. This base enamel is of the self-fluxing type and is designated as Enamel C.

Four coats of Enamel C, the self-fluxing enamel prepared in this example are coated onto a copper wire and then coated with two coats of self-bonding Enamel B according to the procedure in Example 1. Helical coils are formed, bonded, and tested according to the procedure of Example 1. The stress at break is 0.2 lb. for the wire coils bonded at 150° C. and 2.4 lbs. for the wire coils bonded at 175° C. This is a significant drop from those bond strength values reported for the non-self-fluxing system of Example 1. These low bond strength values illustrate the adverse effects that are observed when self-fluxing enamels prepared from blocked isocyanate resins are overcoated with a polyvinyl acetal based self-bonding coat. However, wires coated with the self-fluxing enamel of this example could be soldered without removing the insulation layers to provide excellent soldered joints.

The following Examples 3 to 4 illustrate the significant improvement in bond strength values that are obtained when Enamel B, the polyvinyl acetal based self-bonding enamel prepared in Example 1 above, is formulated with an amine prior to coating a wire insulated with a self-fluxing base coat which in this example is Enamel C prepared in Example 2 above. Unless otherwise indicated in all of the following examples, a 0.0403 diameter copper wire is coated, bonded and tested according to the procedures outlined in Example 1 above.

EXAMPLE 3

Ortho-tolyl biguanide is added to Enamel B in the proportion of ore part per hundred parts of polyvinyl butyral. Two coats of this ortho-tolyl biguanide formulated enamel are applied over four coats of Enamel C and helical coils of the resulting magnet wire are wound, bonded and tested in the manner described above. The stress at break averages 7.8 lbs. for the wire coils bonded at 150° C. and 12.3 lbs. for the wire coils bonded at 175° C. This represents a significant increase over those bond strength values obtained in Example 2 wherein the self-bonding coat did not contain an anime component. Self-fluxing properties of this coated wire are equivalent to those obtained in Example 2 and excellent soldered joints are obtained without the necessity of removing the insulation.

EXAMPLE 4

Example 3 is repeated here except that two (2) parts of ortho-tolyl biguanid is added to Enamel B per hundred parts polyvinyl butyral, instead of the one part used in Example 3. The bond strength values obtained with the coated wire of this Example averages 17.0 lbs. for the wire coils bonded at 150° C. and 18.1 lbs. for the wire coils bonded at 175° C. This represents a significant increase over those bond strength values obtained in Example 2 wherein the self-bonding coat did not contain an amine component. Self-fluxing properties of this coated wire are equivalent to those obtained in Example 2 and excellent soldered joints are obtained without the necessity of removing the insulation.

EXAMPLE 5

This example is essentially the same as Example 4 above except that a different self-bonding enamel is prepared using a lower molecular weight polyvinyl butyral. This new enamel, which is designated as Enamel D, is essentially the same as Enamel B prepared in Example 1 except that one-hundred parts of a polyvinyl butyral resin having a weight-average molecular weight of 40,000 and a hydroxyl content of 19% (expressed as weight percentage of polyvinyl alcohol) is dissolved in a mixture of 210 parts of cresylic acid, 157 parts of high-flash aromatic naphtha and 157 parts of xylol. To this solution is added two parts of ortho-tolyl biguanide per hundred parts of polyvinyl butyral.

Two coats of Enamel D are applied to a wire previously coated with four coats of Enamel C according to the procedure of Example 1. Helical coils are wound, bonded and tested in the same manner as set forth above. The bond strength at break averages 20.1 lbs. for the wire coil bonded at 150° C. and 15.5 lbs. for those wire coils bonded at 175° C., which results are approximately equivalent to those obtained in Example 4. This represents a significant increase over those bond strength values obtained in Example 2 wherein the self-bonding coat did not contain an amine component. Self-fluxing properties of this coated wire are equivalent to those obtained in Example 2 and excellent soldered joints are obtained without the necessity of removing the insulation.

EXAMPLE 6

This example is essentially the same as Example 4 above except that a different self-binding enamel is prepared based on a polyvinyl butyral having a lower hydroxyl content. This new enamel, which is designated as Enamel E, is essentially the same as Enamel B prepared in Example 1 except that 100 parts of a polyvinyl butyral having a weight-average molecular weight of 50,000 and a hydroxyl content of 11% (expressed as weight percentage of polyvinyl alcohol) is dissolved in a mixture of 235 parts of cresylic acid, 177 parts of high-flash aromatic naphtha and 177 parts of xylol. To this solution is added two parts of ortho-tolyl biguanide per 100 parts of polyvinyl butyral.

Two coats of Enamel E are applied over a wire coated with four coats of Enamel C according to the procedure of Example 1. Helical coils are wound, bonded and tested in the manner described in Example 1. The bond strength at break averages 16.7 lbs. for the wire coils bonded at 150° C. and 19.6 lbs. for the wire coils bonded at 175° C., which results are approximately equivalent to those obtained in Example 4. This represents a significant increase over those bond strength values obtained in Example 2 wherein the self-bonding coat did not contain an amine component. Self-fluxing properties of this coated wire are equivalent to those obtained in Example 2, and excellent soldered joints are obtained without the necessity of first removing the insulation.

EXAMPLE 7

Example 3 is repeated here except that 0.5 part of ortho-tolyl biguanide is used per 100 parts of polyvinyl butyral in Enamel B. This amine formulated enamel is used to overcoat the self-fluxing enamel of Example 2 (Enamel C). The bond strength values for self-bonded coils prepared using this system are slightly lower than those obtained in Example 3 where 1% of the ortho-tolyl biguanide is used but significantly higher than Example 2 wherein the self-bonding coat contains no amine component. The solderability of the coated wire of this example is equivalent to that wire prepared in Example 2.

EXAMPLE 8

This example illustrates the use of a self-bonding enamel prepared from a polyvinyl formal resin having a molecular weight of about 17,000 a hydroxyl content of 8.0 (calculated as polyvinyl alcohol) and a residual acetate content of about 11. The polyvinyl formal is dissolved at 13% solids in the solvent used for Enamel E used in Example 6. To this system is added 3.0 parts per 100 parts of polyvinyl formal of ortho-tolyl biguanide. Self-bonded coils of the resulting solderable wire enamel exhibit bond strengths equivalent to those obtained in Example 6.

Several other amine-formulated self-bonding enamels were prepared using the polyvinyl butyral solution used in Enamel B which is set forth in Example 1. Wire coated with self-fluxing Enamel C which is overcoated with these amine-formulated self-bonding coats had acceptable solderability and exhibited bond strengths higher than those obtained in Example 2.

TABLE II.—AMINE FORMULATED ENAMELS

| Example | Enamel designation | Amine component | Parts per 100 parts of polyvinyl butyral |
|---|---|---|---|
| 9 | G | Phenothiazine | 3 |
| 10 | H | Benzylamine | 3 |
| 11 | I | Laurylamine | 5 |
| 12 | J | Hexamethylenediamine | 5 |
| 13 | K | Tetraethylene pentamine | 4 |

EXAMPLE 14

This example is set forth here to illustrate a self-bonding enamel based on polyvinyl butyral and a thermoplastic para-phenylphenol novolac resin which has been modified with an amine component in accordance with the practice of this invention. Seven parts of the polyvinyl butyral resin used in Example B and 3 parts of this thermoplastic novolac resin are dissolved in 100 parts of a solvent consisting of 40% cresylic acid, 30% high-flash aromatic naphtha and 30% xylol. To this resin solution is added 0.3 part of ortho-tolyl biguanide which is about 3 parts per hundred parts of the combined resin component. The resulting enamel, which is designated as Enamel L, is coated over the self-fluxing base enamel (Enamel C) according to the procedures outlined in Example 1. Self-bonded coils of the resulting coated wire are found to possess excellent solderability and bond strength equivalent to those found in Example 3.

TABLE I.—SUMMARY OF EXAMPLES 1 TO 6

| Example | Base coat | Self-bonding coat | Solderable [1] | Amine [2] | Bond strength (lbs.) Bonded at 150° C. | Bonded at 175° C. |
|---|---|---|---|---|---|---|
| 1 (control) | Enamel A (not self-fluxing) | Conventional self-bonding (Enamel B) | No | No | 7.6 | 24.4 |
| 2 (control) | Enamel C (self-fluxing) | do | Yes | No | 0.2 | 2.4 |
| 3 | do | Amine formulated (Enamel B) | Yes | 1 | 7.8 | 12.3 |
| 4 | do | do | Yes | 2 | 17.0 | 18.1 |
| 5 | do | Amine formulated (Enamel D) | Yes | 2 | 20.1 | 15.5 |
| 6 | do | Amine formulated (Enamel E) | Yes | 2 | 16.7 | 19.6 |

[1] Refers to ability of wire to be soldered without first removing insulation layers.
[2] Parts per hundred parts of polyvinyl acetal in self-bonding enamel.

The data in the foregoing Table I readily illustrates the remarkable improvement in bond strengths that are obtained when an amine formulated polyvinyl acetal self-bonding enamel is used over a self-fluxing enamel based on a blocked isocyanate resin. Example 2 which does not contain an amine formulated self-bonding enamel exhibits unsatisfactory bond strength whereas Examples 3 to 6, which contain 1 or 2 parts of an amine component, in the self-bonding enamel give bond strengths far in excess of those obtained in Example 2.

The following examples are set forth to illustrate the diversity in formulations that one may achieve in the practice of the present invention. In each example the wire is coated and tested according to the procedure of Example 1.

EXAMPLE 15

This example is set forth here to illustrate an amine-modified self-bonding enamel based on a polyvinyl butyral resin and a thermoplastic epoxy resin. This self-bonding magnet wire enamel, which is designated here as Enamel M, is prepared by dissolving 10 parts of polyvinyl butyral resin used in Enamel B and 2 parts of a thermoplastic epoxy resin in 100 parts of the solvent used to prepare Enamel B. To this solution is added 0.4 part of orthotolyl biguanide which is about 3.3 parts per hundred parts of the combined resin component. This enamel is coated over the self-fluxing Enamel C and self-bonded coils of the resulting wire are found to have excellent solderability and bond strengths which are comparable to those obtained in Example 4.

EXAMPLE 16

This example is set forth here to illustrate the variations in the self-fluxing resins which are overcoated with the amine modified self-bonding enamels of the present invention.

A self-fluxing enamel is prepared by dissolving 67 parts of a blocked triisocyanate resin, 28 parts of a polyester resin of hydroxyl number approximately 290 and equivalent weight of 200, and five parts of a polyester resin of hydroxyl number approximately 160 and equivalent weight approximately 335 in 85 parts cresylic acid and 125 parts high-flash naphtha. Four coats of this self-fluxing enamel are applied to a copper wire, followed by two coats of Enamel D. Solderability and bond strength are equivalent to those of Example 5.

EXAMPLE 17

This example is set forth to illustrate another variation in a self-fluxing enamel which is overcoated with an amine formulated self-bonding wire enamel.

A self-fluxing enamel is prepared by dissolving 67 parts of a blocked triisocyanate resin, 28 parts of a polyester resin of hydroxyl number approximately 290 and equivalent weight of 200, and five parts of polyamide resin in 85 parts cresylic acid and 125 parts high-flash naphtha. Four coats of this self-fluxing enamel (designated Enamel) are applied to a copper wire, followed by two coats of Enamel D. Solderability and bond strengths are equivalent to those of Example 5.

The improved bond strengths obtained in the practice of this invention are achieved without any adverse effects on other desirable magnet wire properties such as dielectric strength, resistance to burnout, and heat shock, etc.

As stated above the present invention is directed to an amine-formulated polyvinyl acetal based self-bonding wire enamel for use over self-fluxing wire enamels based on blocked isocyanate resins.

These self-fluxing wire enamels are prepared from blocked isocyanate resins well known in the art. Generally, they are adducts of organic polyisocyanates in which isocyanate groups are "blocked" by reaction with the reactive hydrogen of another organic compound. Suitable polyisocyanates include compounds such as phenylene diisocyanates, diphenylene diisocyanates, tolylene diisocyanates, naphthylene diisocyanates, diphenylmethane diisocyanates, cyclohexylene diisocyanates, ethylene diisocyanates, tetramethylene diisocyanates, hexamethylene diisocyanates, polyaryl polyisocyanates, trimers of polyisocyanates, polyisocyanates which are the reaction products of diisocyanates or triisocyanates with polyhydric alcohols and the like, and mixtures, trimers and isomers thereof.

The simplest class of useful polyisocyanates can be represented by the following general formula:

$$R(-N=C=O)_n$$

where R represents a radical of appropriate valence derived from a member of the class consisting of aliphatic hydrocarbons containing up to 8 carbon atoms, aromatic hydrocarbons containing up to 13 carbon atoms, alicyclic hydrocarbons containing up to 6 carbon atoms, and alkyl aryl substitutes thereof; and $n$ is an integer from 2–4.

Typical examples of the reaction products of polyisocyanates with polyhydric alcohols can be illustrated by the following general formula:

$$R-\left(-O-\overset{O}{\underset{}{C}}-\overset{H}{\underset{}{N}}-R-N=\overset{O}{\underset{}{C}}\right)_n$$

where R is the same as defined in the above formula for the polyisocyanates and $n$ is an integer from 2–10.

A blocked isocyanate is a thermally unstable polyurethane in which a polyisocyanate is combined with a blocking agent which contains an active hydrogen. The preferred blocking agents are compounds with a hydroxyl group attached to an aromatic ring, i.e., phenols.

The preferred polyurethanes may be prepared by reacting the monohydric phenol with the reaction product of a polyhydric alcohol and an arylene diisocyanate. The polyhydric alcohols are in general preferably limited to compounds containing not more than 16 carbon atoms. For use in wire enamels, the polyhydric alcohols should contain preferably not more than 10 carbon atoms. Examples of these alcohols are ethylene glycol, propylene glycol, glycerol, a hexane triol (e.g., trimethylol propane) pentaerythritol, etc. The monohydric phenol may be an aryl compound such as phenol, cresols, xylenols and ethyl phenol. This class of preferred polyurethanes can be represented by the general formula:

$$C_n-H_{2n+2-m}(-O-\overset{O}{\underset{}{C}}-\overset{H}{\underset{}{N}}-R-\overset{H}{\underset{}{N}}-\overset{O}{\underset{}{C}}-O-X)_m$$

where R represents a member of the class consisting of phenylene, methyl phenylene, dimethyl phenylene, naphthylene and methyl naphthylene groups, X represents a member of the class consisting of phenyl and alkyl phenyl groups, said alkyl groups containing 1–6 carbon atoms, $m$ is an integer greater than 1 but not greater than $n$, and $n$ is an integer from 2–10.

Generally, the self-fluxing blocked isocyanate resins are formulated with other resinous materials prior to being applied as a base coat to the metal conductor. Examples of resinous materials used in the base enamel formulation would include polyvinyl acetals, polyesters, polyamides, etc. These formulations are generally well known to those skilled in the art and need no further explanation here.

The self-bonding wire enamels of this invention are preferably based on polyvinyl acetals and on polyvinyl acetals which may be formulated with other thermoplastic resins such as thermoplastic epoxy and novolac polyester and amide type resins and other resins which are well known to those skilled in the art. However, the particular choice of the polyvinyl acetal resins useful in this invention are obtained by reacting polyvinyl alcohol or a partially hydrolyzed polyvinyl ester with an aldehyde, especially formaldehyde and butyraldehyde. Polyvinyl acetals contain hydroxyl groups and may contain a certain number of ester groups depending upon the extent of the hydrolysis and the acetalization reactions. The preferred polyvinyl acetal resins contain on a weight basis, 0 to 20% ester groups calculated as polyvinyl ester, 2 to 25% hydroxyl groups calculated as polyvinyl alcohol and the balance substantially formaldehyde acetal, butyraldehyde acetal or other related acetals depending on the aldehyde used. These materials should have a weight average molecular weight in the 5,000 to 500,000 molecular weight range with a range of from 10,000 to 300,000 being preferred.

Other polyvinyl acetals such as the reaction product of hydrolyzed polyvinyl esters with acetaldehyde, propionaldehyde and benzaldehyde may also be used in the practice of this invention.

The final choice of polyvinyl acetal used will depend on the particular properties required in a given system such as solids content hydroxyl content, solubility, compatibility, etc.

The preferred polyvinyl acetals for use in the present invention are polyvinyl butyral and polyvinyl formal with polyvinyl butyral being especially preferred.

The polyvinyl acetal resins used in the self-bonding enamels of this invention may be formulated with other thermoplastic resins as shown above. Preferably one would use at least 5 parts by weight per 100 parts of total resin solids in the self-bonding composition of a polyvinyl acetal. These self-bonding magnet wire coating formulations are generally well known to those skilled in the art and need no further discussion here.

The amine formulated self-bonding magnet wire enamels used in the practice of this invention are dissolved in a solvent medium for conventional wire coating application. Any non-reactive volatile mutual solvents for the resinous components may be used, such as substituted and unsubstituted aliphatic and aromatic solvent systems. For the coating of magnet wire, the solvent medium preferably contains a substantial amount of a phenol such as phenol, cresol, xylenol; and predominantly aromatic hydrocarbons such as xylene, naphtha and mixtures thereof such as the high solvency petroleum hydrocarbons used in the examples. A preferred naphtha hydrocarbon mixture is a mixture of aromatic liquid hydrocarbons of boiling range 150–184° C. derived from coal-tar and/or petroleum. A preferred cresylic acid is a mixture of liquid phenolic compounds consisting primarily of xylenols and cresols and having a boiling range of 195–227° C.

The amine components of self-bonding enamels of the present invention are primary or secondary amines which may be either aliphatic or aromatic amines containing at least one amine group per molecule. Preferred are those amines of low volatility which will not volatilize during the wire coating operations. In general the self-bonding coat on the insulation wire should contain at least 0.5 part of the amine component per 100 parts of resin in the self-bonding coat. The maximum amount of amine to be incorporated into the self-bonding insulative coat will depend upon the particular system used. In general, no advantage is seen to using more than 10 parts of the amine component per 100 parts of resin in the self-bonding coat.

The amount of amine component that must be incorporated into the self-bonding enamel solution in order to achieve the minimum concentration of at least 0.5 part of amine component per hundred parts of resin in the self-bonding insulation coat on the magnet wire will be readily apparent to those skilled in the art upon reading the foregoing description.

In general, when the boiling point of the amine is above the temperature of the oven in the wire coating procedure, little or no amine is lost during the coating operation and the relative proportions of amine component and self-bonding resin base in the enamel solution and in the coated wire will be essentially the same.

When the choice of amine component or coating conditions are such that the boiling point of the amine is lower than the temperature of the oven some amine component may be lost during the coating operation. Therefore, care must be taken to use an amount of amine component in the enamel solution which is in excess of that desired in the self-bonding insulation coat on the wire in order to compensate for the amount which may be lost during the wire coating operation.

This excess amount which may be required will become readily apparent to those skilled in the art in view of the foregoing discussion and further in view of such factors as the particular amine used, coating temperatures, residence time of the coated wire in the oven, etc.

The amine component may be combined with the resin component of the self-bonding enamel during various stages in the manufacture of the resin or the enamel.

For example, it may be added to the resin at the time of washing out the solvent from which it has been precipitated, or by dry-blending with the resin, or it may be dissolved into the self-bonding wire enamel.

Examples of amine components suitable for use in the practice of this invention would include the following: aminocresol, anisidine, biguanide, biuret, benzylamide, benzoguanamine, cyclohexylamine, chlorobenzylamine, dibenzoguanamine, dicyclohexylamine, diethylenetriamine, diphenylbiguanide, N,N'-diphenyl para-phenylene diamine, ethanolamine, guanidine, hexamethylenediamine, laurylamine, phenothiazine, phenylbiuret, phenylbiguanide, phenylguanidine, pentaethylenehexamine, tetraethylenepentamine, triethylenetetramine, ortho-tolyl guanidine, ortho-tolyl biguanide, ortho-tolyl biuret, para-tolyl biguanide, para-tolyl biuret.

As is evident from the foregoing description and examples, the expression "primary and secondary amines" as used in relation to this invention and as claimed includes amidines and derivatives thereof such as guanidine and ortho-tolyl biguanide irrespective of any resonance forms which may occur which may not behave as primary and/or secondary amines in terms of the classical chemical reactions.

Metal conductors coated with the self-bonding wires of the present invention may be formed into bonded coils according to any of the procedures well known to those skilled in the art. These procedures would include the use of heat and/or solvents to soften the self-bonding coat so as to cause the coils to bond together when the resin returns to the hardened state.

The self-bonding resins of this invention may be further formulated with stabilizers, antioxidants, viscosity control agents, leveling agents and other adjuncts which are well known to those skilled in the art.

From the foregoing it should be apparent to those skilled in the art that many modifications can be made in this invention without departing from the spirit and scope thereof.

What is claimed is:

1. A self-bonding magnet wire comprising a metal conductor coated with a cured self-fluxing base enamel prepared from a blocked isocyanate resin which in turn is coated with a self-bonding polyvinyl acetal based enamel composition which contains from 0.5 to 10 parts per hundred parts of resin in the self-bonding enamel coat of an amine component selected from the group consisting of primary and secondary amines; wherein the amount of polyvinyl acetal in the polyvinyl acetal based enamel composition is at least 50 parts by weight per 100 parts of total resin solids in said enamel composition.

2. The self-bonding magnet wire of claim 1 wherein the polyvinyl acetal is polyvinyl butyral.

3. The self-bonding magnet wire of claim 1 wherein the polyvinyl acetal based composition is prepared from polyvinyl butyral and a thermoplastic epoxy resin.

4. The self-bonding magnet wire of claim 1, wherein the polyvinyl acetal based composition is prepared from polyvinyl butyral and a thermoplastic novolac resin.

5. The self-bonding magnet wire of claim 1 wherein the amine component is selected from the group consisting of phenothiazine, benzylamine, ethanolamine, tetra ethylenepentamine and ortho-tolyl biguanide.

6. A process for the preparation of self-fluxing, self-bonding magnet wire which comprises:
   (A) coating a metal conductor with at least one coat of self-fluxing base enamel prepared from a blocked isocyanate resin,
   (B) curing the wire coated as in (A) above through the use of heat,
   (C) applying at least one coat of a self-bonding enamel over the wire coated with the self-fluxing base enamel; wherein the self-bonding enamel comprises a polyvinyl acetal based composition which contains from 0.5 to 10 parts per hundred parts of resin in the self-bonding enamel of an amine component selected from the group consisting of primary and secondary amines; wherein the amount of polyvinyl acetal in the polyvinyl acetal based enamel composition is at least 50 parts by weight per 100 parts of total resin solids in said enamel compositions;

7. The process of claim 6 wherein the polyvinyl acetal based composition is selected from the group consisting of polyvinyl acetal and polyvinyl acetal formulated with thermoplastic epoxy resins, thermoplastic novolac resins and thermoplastic polyester resins.

8. The process of claim 6 wherein the amine is selected from the group consisting of phenothiazine, benzylamine, ethanolamine, tetraethylene-pentamine and ortho-tolyl biguanide.

References Cited

UNITED STATES PATENTS

| | | | |
|---|---|---|---|
| 2,917,416 | 12/1959 | Lavin et al. | 117—218 X |
| 3,239,598 | 3/1966 | Olson et al. | 117—218 X |
| 3,240,626 | 3/1966 | Olson et al. | 117—218 |
| 3,300,843 | 1/1967 | Umewaka et al. | 117—218 X |
| 3,412,354 | 11/1968 | Sattler | 174—120 X |

WILLIAM D. MARTIN, Primary Examiner

R. HUSACK, Assistant Examiner

U.S. Cl. X.R.

29—605; 117—63; 260—91.1, 836, 844, 857